(12) United States Patent
Ryyppö

(10) Patent No.: US 8,185,279 B2
(45) Date of Patent: May 22, 2012

(54) CONTROL SYSTEM FOR TRACTION TRANSMISSION AND HYDRAULIC MOTOR USED THEREIN

(75) Inventor: Roni Ryyppö, Palokka (FI)

(73) Assignee: Sampo-Hydraulics Oy, Jyskä (FI)

( * ) Notice: Subject to any disclaimer, the term of this patent is extended or adjusted under 35 U.S.C. 154(b) by 1154 days.

(21) Appl. No.: 12/020,293

(22) Filed: Jan. 25, 2008

(65) Prior Publication Data
US 2008/0189017 A1 Aug. 7, 2008

(30) Foreign Application Priority Data

Jan. 26, 2007 (FI) .................................... 20075057
Jun. 1, 2007 (FI) .................................... 20075400

(51) Int. Cl.
*G06F 7/00* (2006.01)

(52) U.S. Cl. ............... 701/51; 701/54; 701/56; 701/58; 701/60; 701/62; 60/425; 180/305; 180/306; 180/307; 180/308; 477/1; 477/52

(58) Field of Classification Search .................. None
See application file for complete search history.

(56) References Cited

U.S. PATENT DOCUMENTS

| | | | | |
|---|---|---|---|---|
| 3,403,599 A * | 10/1968 | Guinot | ............... | 91/6.5 |
| 4,036,323 A * | 7/1977 | Schmall | ............... | 180/179 |
| 4,404,896 A * | 9/1983 | Allart et al. | ............... | 91/491 |
| 4,807,519 A * | 2/1989 | Wusthof et al. | ............... | 91/492 |
| 5,186,094 A * | 2/1993 | Allart | ............... | 91/491 |
| 6,230,829 B1 * | 5/2001 | Martin et al. | ............... | 180/6.3 |
| 6,269,901 B1 * | 8/2001 | Moffett et al. | ............... | 180/308 |
| 6,367,572 B1 * | 4/2002 | Maletschek et al. | ............... | 180/305 |
| 6,386,307 B1 * | 5/2002 | Martin et al. | ............... | 180/242 |
| 6,494,126 B1 * | 12/2002 | Leinonen | ............... | 91/491 |
| 6,508,328 B1 * | 1/2003 | Kenyon et al. | ............... | 180/308 |
| 6,978,713 B2 * | 12/2005 | Allart et al. | ............... | 92/72 |
| 6,991,058 B2 * | 1/2006 | Cousin et al. | ............... | 180/242 |
| 7,185,579 B2 * | 3/2007 | Allart et al. | ............... | 92/72 |
| 7,337,869 B2 * | 3/2008 | Gray et al. | ............... | 180/307 |
| 7,377,354 B2 * | 5/2008 | Smalley | ............... | 180/305 |
| 7,406,824 B2 * | 8/2008 | Lucienne et al. | ............... | 60/464 |
| 7,637,101 B2 * | 12/2009 | Uezono et al. | ............... | 60/425 |

FOREIGN PATENT DOCUMENTS

WO 92/10677 A1 6/1992

OTHER PUBLICATIONS

"Twin-Lock System—A Simple Solution to Difficult Task", by Wang Qian, Poclain Hydraulics Beijing Office, P.R. China, published prior to Mar. 17, 2003, http://fluid.power.net/techbriefs/hanghzau/4_34.pdf.
Search Report issued in FI 20075057.
U.S. Appl. No. 12/019,796, filed Jan. 25, 2008.

* cited by examiner

*Primary Examiner* — Khoi Tran
*Assistant Examiner* — Jonathan L Sample
(74) *Attorney, Agent, or Firm* — Stiennon & Stiennon

(57) ABSTRACT

A control system (100) for traction transmission has at least two multi capacity motors ($M_1$, $M_2$), which are adapted to rotate a vehicle's wheels ($J_1$, $J_2$) and which multi capacity motor ($M_1$) is arranged to rotate a traction wheel ($J_2$), and the multi capacity motor ($M_2$) is arranged to rotate another traction wheel ($J_1$), whereby motor parts ($M_{1a}$ and $M_{2a}$) of partial rotational volumes of the multi capacity motors ($M_1$, $M_2$) can be connected in series, whereby the anti-slip is on.

8 Claims, 14 Drawing Sheets

CONTROL SYSTEM FOR TRACTION TRANSMISSION AND HYDRAULIC MOTOR USED THEREIN

CROSS REFERENCES TO RELATED APPLICATIONS

This application claims priority on Finnish App. No. 20075057, filed Jan. 26, 2007, and Finnish App. No. 20075400, filed Jun. 1, 2007, the disclosures of which are incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The invention concerns a control system for traction transmission and a hydraulic motor used therein.

Known in the state of the art are vehicle traction transmission solutions, in which hydraulic motors are used. Such hydraulic motor solutions are known in the state of the art, where such separate motors are used at the driving wheels, which can be controlled independently of each other. However, a persistent drawback in the known vehicle solutions is the uncontrolled slip situation, where a traction wheel slips, and it has not been possible to transmit power in an advantageous manner to the other traction wheels. The present application presents a new traction transmission solution, wherein two traction wheels can be connected in series in order to carry out an anti-slip function. The application preferably uses such a control system for the traction transmission, where such radial piston motors are used at the traction wheels, which are multi volume motors, whereby in a slip situation the motors can be connected at other motor parts in series in relation to one another.

There are also hydraulic motor requirements in traction transmission, which would need such a hydraulic motor structure, where it is possible to change the speed of rotation and the related moment or torque of a pump-operated hydraulic motor by the same pump output, which supplies the system. There are different device drives, where the driving wheel or traction wheel begins slipping undesirably. For said problems there ought to be such a hydraulic motor, which when placed in a hydraulic system would function as a motor where slipping would be prevented. Thus, the objective is a traction transmission system and a hydraulic motor, where, for example, at the so-called full rotational volume, that is, at the slower speed, the highest moment is achieved and with the same output another operating mode can be controlled, where, for example, at the hydraulic motor's ½ rotational volume a higher speed of rotation is achieved for the traction wheel along with a lower moment. In a hydraulic motor, for example, ½ rotational volume parts can be connected purely in series with another multi capacity hydraulic motor, whereby slipping of the multi capacity hydraulic motor is prevented in a series connection of the concerned motors.

SUMMARY OF THE INVENTION

This application also presents a new type of piston hydraulic motor, preferably a radial piston hydraulic motor, which allows at least two different operating modes; an operating mode, where a hydraulic motor operates at the lowest speed of rotation and at the highest moment and where the entire motor volume is full volume, whereby all pistons of the radial piston hydraulic motor are in operation at the full working pressure produced by the pump, and a partial volume operating mode, where the number of pistons working at each time is reduced, whereby the motor's speed of rotation correspondingly increases and the moment of the hydraulic motor is reduced. With a constant pump output different speeds and moments are achieved as well as at least two different speeds and different moments related to these. According to the invention, the hydraulic motor can be controlled from partial rotational volume to full rotational volume according to pressure detection and the resulting control.

As the multi capacity motor the invention preferably uses a radial piston hydraulic motor, where the piston body comprises piston-type cylinders and pistons in these. To each piston a presser wheel is connected, which is adapted to press against a cam ring. The cylinders in the piston body are located radially. In one embodiment, the piston body proper is in a fixed non-rotating position, as is the shaft of the hydraulic motor. On the shaft a distributor is located, through which hydraulic oil is distributed step by step to each piston and which rotates with the casing, which is rotated by the rotated cam ring. According to the invention, the shaft has a bore, in which there is a control spindle. The control spindle comprises pistons or necks or broadened parts, the function of which is to close and open oil channels. Thus, by moving the spindle one pressurized oil channel is opened and closed. In one embodiment the device solution thus comprises two pressurized inlet channels $A_1$ and $A_2$ and one outlet channel $A_3$, $A_4$ for the hydraulic motor. When the direction of rotation of the hydraulic motor is changed, the pressurized medium is changed to arrive through the channels $A_3$, $A_4$ and the discharging flows will take place through the two inlet channels $A_1$ and $A_2$.

In the following, the invention will be described by referring to some advantageous embodiments of the invention shown in the figures of the appended drawings, but there is no intention to limit the invention to these alone.

BRIEF DESCRIPTION OF THE DRAWINGS

FIG. 7A shows the initial situation and FIG. 7B shows the final situation.

DESCRIPTION OF THE PREFERRED EMBODIMENTS

Figure 1A:
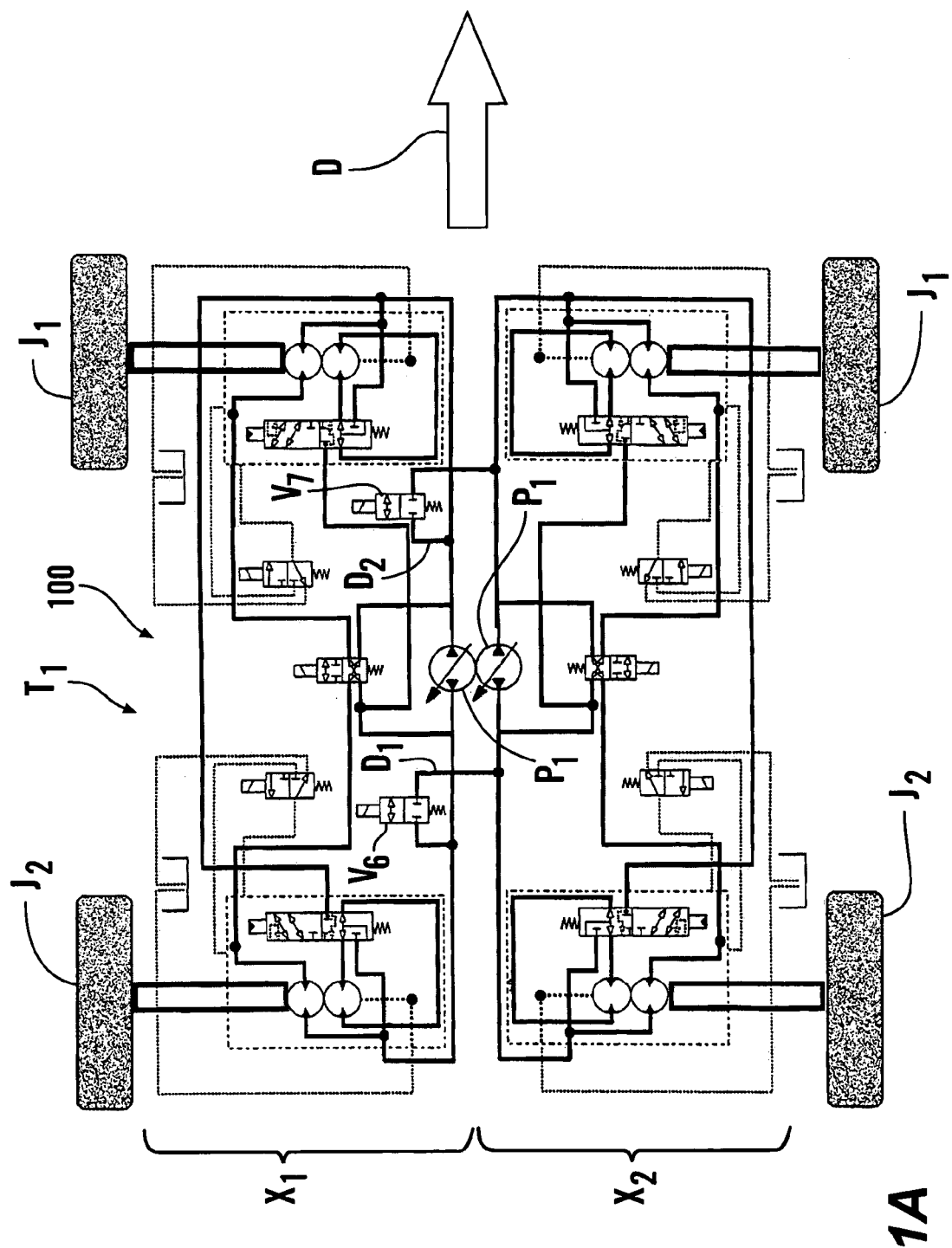
FIG. 1A shows the hydraulic diagram of the control system for traction transmission according to the invention. The system comprises halves $X_1$ and $X_2$, which are identical and similar to one another. The halves $X_1$ and $X_2$ may be connected to each other by connecting channels $D_1$ and $D_2$, which comprise shut-off valves $V_6$ and $V_7$.

FIG. 1A shows a control system 100 for the traction transmission of; for example, a forestry machine, a tractor, an all-terrain vehicle or some other such vehicle $T_1$. The control system 100 is preferably a hydraulic control system and preferably a closed system. The system according to the figure comprises halves $X_1$ and $X_2$ of the control system for the traction transmission, which halves are identical and similar to one another in the figure. As is shown in the figure, pumps $P_1$ produce a pressurized medium and the pumps are rotated by a diesel engine, which is not shown. Pumps $P_1$ may be coaxial and driven by a diesel engine, and the pressure produced by the pumps can be controlled separately at each pump $P_1$ when required in order to control the speed of vehicle $T_1$. However, a common control is usually sufficient. As is shown in FIG. 1A, the halves $X_1$ and $X_2$ are connected to each other through pipe fittings $D_1$ and $D_2$, which comprise shut-off valves $V_6$ and $V_7$, whereby the system halves $X_1$ and $X_2$ can also be connected in connection with each other. There are four traction wheels in the vehicle. Such an embodiment is also possible within the scope of the invention, where a series connection is made between the motors $M_{1a}$ and $M_{2a}$, which are located in different parts of the vehicle $T_1$ in different halves $X_1$ and $X_2$. When the direction of travel D of vehicle $T_1$ is changed, the direction of rotation of pumps $P_1$ is changed.

Figure 1B:
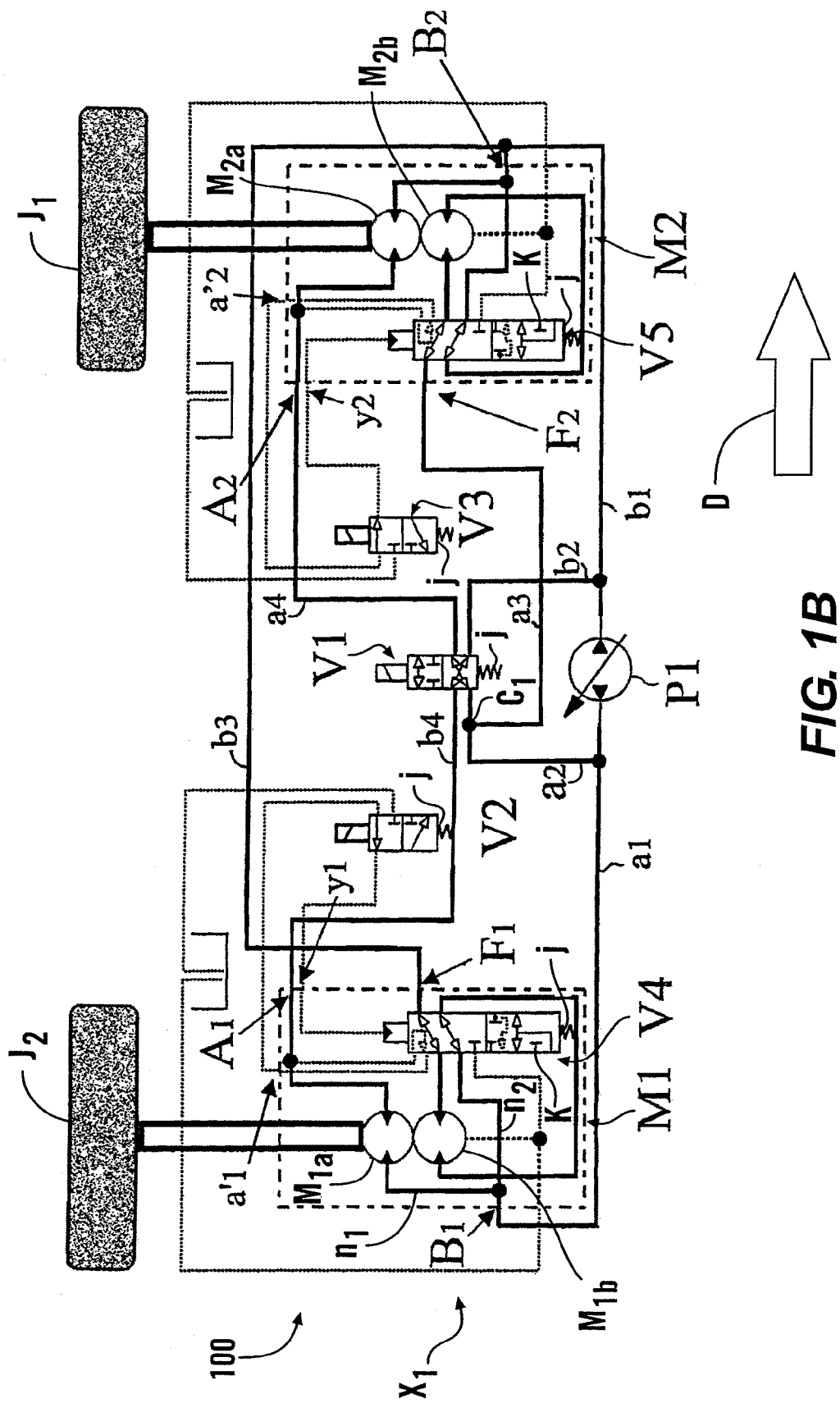
FIG. 1B shows the hydraulic diagram of the control system of FIG. 1A at its system half $X_1$, which is similar to the system half $X_2$ in the embodiment shown in FIG. 1A. In the phase shown in FIG. 1B, the anti-slip is not on, and the motor parts $M_{1a}$ and $M_{2a}$ are not series-connected.

The invention is described in FIG. 1B and it shows one half of the control system; half $X_1$. The half $X_1$ is used to control the front and rear wheels $J_1$ and $J_2$ of one half of the vehicle. The half $X_2$ is similar and it is used to control the front and rear wheels $J_1$ and $J_2$ of the other half of the vehicle. Thus, the vehicle is one with four-wheel drive.

As is shown in FIG. 1B, the direction of travel of vehicle $T_1$ is indicated by an arrow D in this figure. Pump $P_1$ produces a pressure in the system 100. As is shown in FIG. 1B, the pressurized medium is conducted from pump $P_1$ as arrows indicate in the embodiment shown in the figure into line $a_1$ and further to the motor $M_1$, which is a multi capacity motor and, for example, a radial piston hydraulic motor of a type to be presented later, the shaft of which is in a fixed position or the shaft is rotated. Both embodiments are possible. In the figure, the internal structure of the motors $M_1$ and $M_2$ are delimited as shown by dashed lines. As is shown in FIG. 1B, in the working phase shown in FIG. 1B the pressurized medium is thus brought from pump $P_1$ into line $a_1$ and further through one inlet $B_1$ to the multi capacity motor $M_1$, from which it is conducted as shown in the figure through line $n_1$ to the motor part $M_{1a}$ of multi capacity motor $M_1$ and through line $n_2$ to an interior valve $V_4$ in motor $M_1$ and further through this to the motor part $M_{1b}$ of the multi capacity motor. From motor $M_1$ there are two return lines $b_3$ and $b_4$ leading out.

As shown in FIG. 1B, from line $a_1$ there is a branch line $a_2$ for pressurized hydraulic oil further to valve $V_1$ and through branch line $a_3$ and through inlet $F_2$ to an interior valve $V_5$ in the other multi capacity motor $M_2$. The inlet connection for valve $V_5$ is indicated by reference number $F_2$.

Motors $M_1$ and $M_2$ are similar multi capacity motors. From multi capacity motor $M_2$ there is an outlet $B_2$ into line $b_1$ and back to pump $P_1$ in a closed circulation, when valve $V_1$ is in the position shown in FIG. 1B.

In the embodiment shown in FIG. 1B and in the operating mode shown in FIG. 1B, motor $M_1$ has one pressure line $a_1$ leading in and two return lines $b_3$ and $b_4$ leading out. Motor $M_2$ comprises two pressure lines $a_3$ and $a_4$ leading in and one outlet $B_2$ and a return line $b_1$ connected to this and leading out. The system preferably comprises in motors $M_1$ and $M_2$ inbuilt control components $V_4$, $V_5$, preferably valves, which comprise a control component for the oil flow, preferably a spindle K, 51.

In the phase shown in FIG. 1B, motors $M_1$ and $M_2$ are at the full rotational volume, whereby they will have the maximum moment and minimum speed of rotation. In the phase shown in FIG. 1B, valves $V_5$, $V_4$, $V_3$ and $V_2$ are trimmed, so to speak, that is, their valve spindles are moved by the solenoid against the spring force of the spring J at the end of the spindle into a position allowing the flow to pass through.

Valve $V_4$ is trimmed against the spring force of spring J by a supply pressure from line $b_4$, when the valve $V_2$ is active. Hereby the solenoid of valve $V_2$ has moved the spindle of valve $V_2$ to a position, where pressurized medium is allowed through valve $V_2$ to the end of the control spindle of valve $V_4$, whereby valve $V_4$ is in the position shown in FIG. 1B.

Correspondingly, when valve $V_1$ is in the position shown in FIG. 1B, pressurized medium is allowed from pump $P_1$ through line $a_2$ and through valve $V_1$ into line $a_4$ and through a branch point $c_1$ in line $a_2$ into line $a_3$ and further to the multi capacity motor $M_2$ into its motor part $M_{2b}$, which implements the partial rotational volume, for example, the ½ rotational volume.

Valve $V_5$ is trimmed by supply pressure from line $a_4$, when valve $V_3$ is active, as shown in the figure. Hereby the valve spindle in valve $V_3$ is pressed against the spring force of spring J into a position, where control pressure is allowed through valve $V_3$ to the end of the control spindle of valve $V_5$ and the valve $V_5$ is thus moved against the spring force of its valve spring J to the position shown in FIG. 1B, where motor part $M_{2b}$ is also on and receiving working pressure and motor $M_2$ is at the full rotational volume according to FIG. 2.

As shown in FIG. 1B, line $b_4$ is connected through valve $V_1$ to line $b_2$ and line $b_2$ is connected to the return line $b_1$ of pump $P_1$. Motors $M_1$ and $M_2$ are not connected in series, so the anti-slip function is not on.

In the phase shown in FIG. 1B, the line $b_4$ from outlet A1 of motor part $M_{1a}$ of motor $M_1$ is connected to the return line $b_2$ through valves $V_1$. The pressure line $a_2$ is connected through valve $V_1$ to line $a_4$ and to the inlet of motor part $M_{2a}$ of motor $M_2$. The motor parts $M_{1a}$ and $M_{2a}$ are not connected in series, so the anti-slip function is not on.

The pressure from line $b_4$ is conducted through line $a'_1$ to spindle K of valve $V_4$ and further through it to valve $V_2$ and further through it, if valve $V_2$ is in the position shown in FIG. 1B, that is, activated, to the end of spindle K of valve $V_4$ to control spindle K to a position, which is shown in FIG. 1B, that is, to the trimmed position against the spring force of spindle K of valve $V_4$.

At the valve $V_5$ the control is of a similar kind. Control pressure is brought to the end of the spindle of valve $V_5$ from line $a_4$ and it is circulated through the spindle of valve $V_5$ further to valve $V_3$, which allows the control pressure to pass through it when the valve $V_3$ is in the activated position shown in FIG. 1B, whereby the control pressure is allowed as shown in the figure to the end of spindle K of valve $V_5$ to control it to the position shown in FIG. 1B. In the phase shown in FIG. 1B, the multi capacity motors $M_1$ and $M_2$ are not in a series-connection and the anti-slip function is not on.

Figure 2:
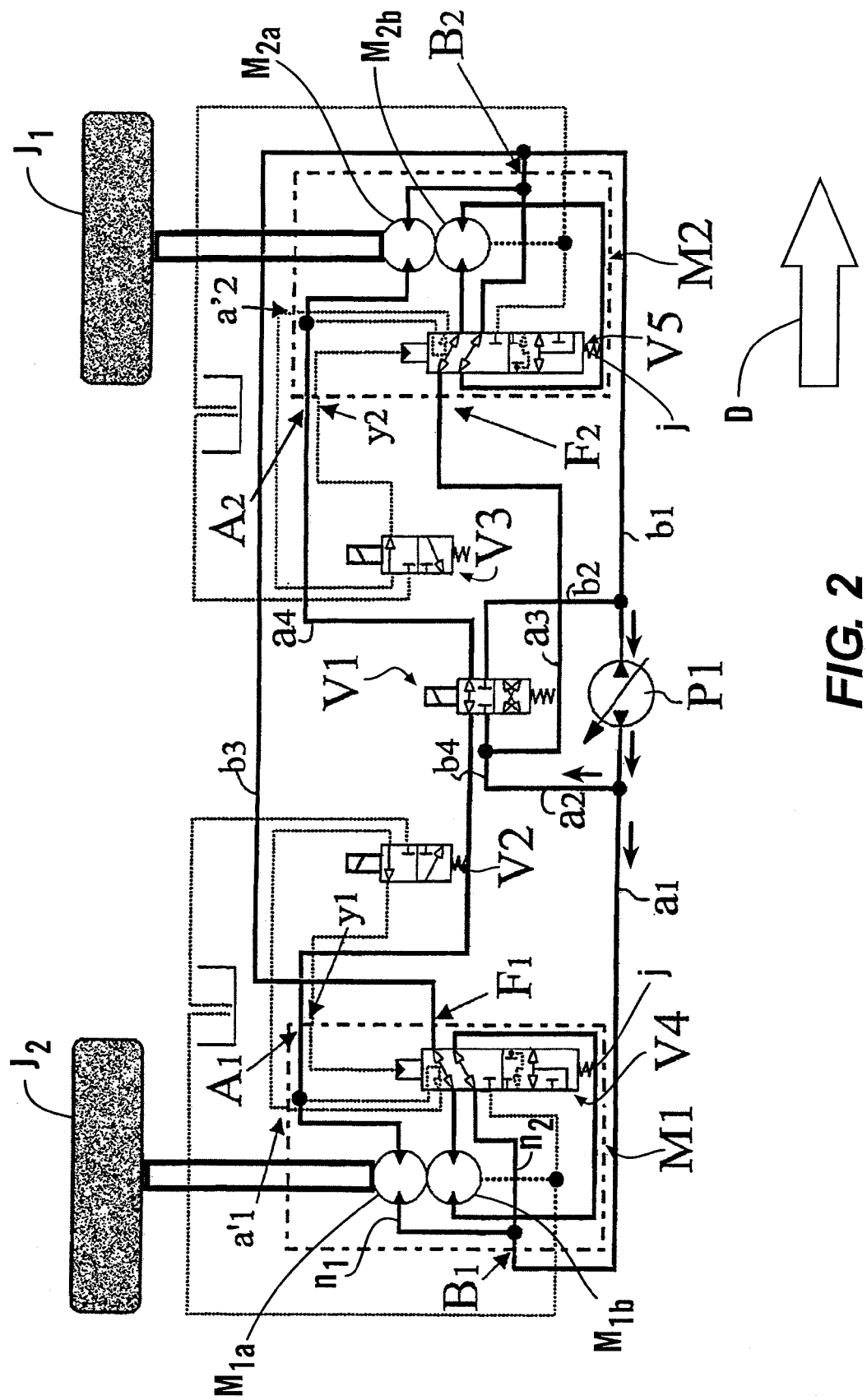
FIG. 2 shows the control phase following after FIG. 1B, and here the valve $V_1$ connects the motor's $M_1$ motor part $M_{1a}$ with the motor's $M_2$ motor part $M_{2a}$, whereby a series connection is brought about between said motors and the anti-slip is on; motor part $M_{1b}$ and motor part $M_{2b}$ are in working operation. Arrows show the oil flow direction of the oil made to flow by the pump $P_1$.

FIG. 2 shows a phase in the operation where motors $M_1$ and $M_2$ are connected in series at their motor parts $M_{1a}$ and $M_{2a}$ and connected in parallel, so to speak, at their motor parts $M_{1b}$ and $M_{2b}$. An operating volume of 75% is hereby achieved.

The series connection and parallel connection shown in FIG. 2 are achieved in such a way that valve $V_1$ is moved to the position shown in FIG. 2. Hereby the line $b_4$ from the multi capacity motor $M_1$ is connected through valve $V_1$ to line $a_4$ and to the multi capacity motor $M_2$ and the motor parts $M_{1a}$ and $M_{2a}$ in the multi capacity motors $M_1$ and $M_2$ are connected in series in relation to each other, and hereby slipping of the traction wheels $J_1$, $J_2$ is prevented. In the embodiment in FIG. 2, motors $M_1$ and $M_2$ are thus in a series-connected state as regards the partial volumes $M_{1a}$ and $M_{2a}$, and the anti-slip function is hereby active. Hereby the speed of the multi capacity motors $M_1$ and $M_2$ increases and the moment is reduced. In the phase shown in FIG. 2, the motor parts $M_{1b}$ and $M_{2b}$ as well as the partial volumes, such as ½ volumes, are also in use.

If in the phase shown in FIG. 2 the front wheel $J_1$ begins slipping, the pressure in line $a_4$ will be reduced. When the force caused by the pressure is reduced below the spring force of spring J of valve $V_5$, valve $V_5$ will move motor $M_2$ to partial volume and will close the pressure line $F_2$, as happened in the way shown in FIG. 3.

Thus, when wheel $J_1$ begins slipping, the pressure of the medium will disappear from line $a_4$. When the pressure is reduced from connection a'2, the pressure is also reduced through valve $V_3$ from connection $Y_2$, as a result of which the spring force of valve $V_5$ will win over the concerned pressure force from the valve's $V_5$ connection $Y_2$. The spindle will hereby move and the inlet $F_2$ will close, and as a result of this the pressure in line $a_1$ begins growing and motor $M_1$ will have a higher pressure, whereby it tries to move at a higher moment the traction wheel $J_2$ connected to motor $M_1$.

Figure 4:
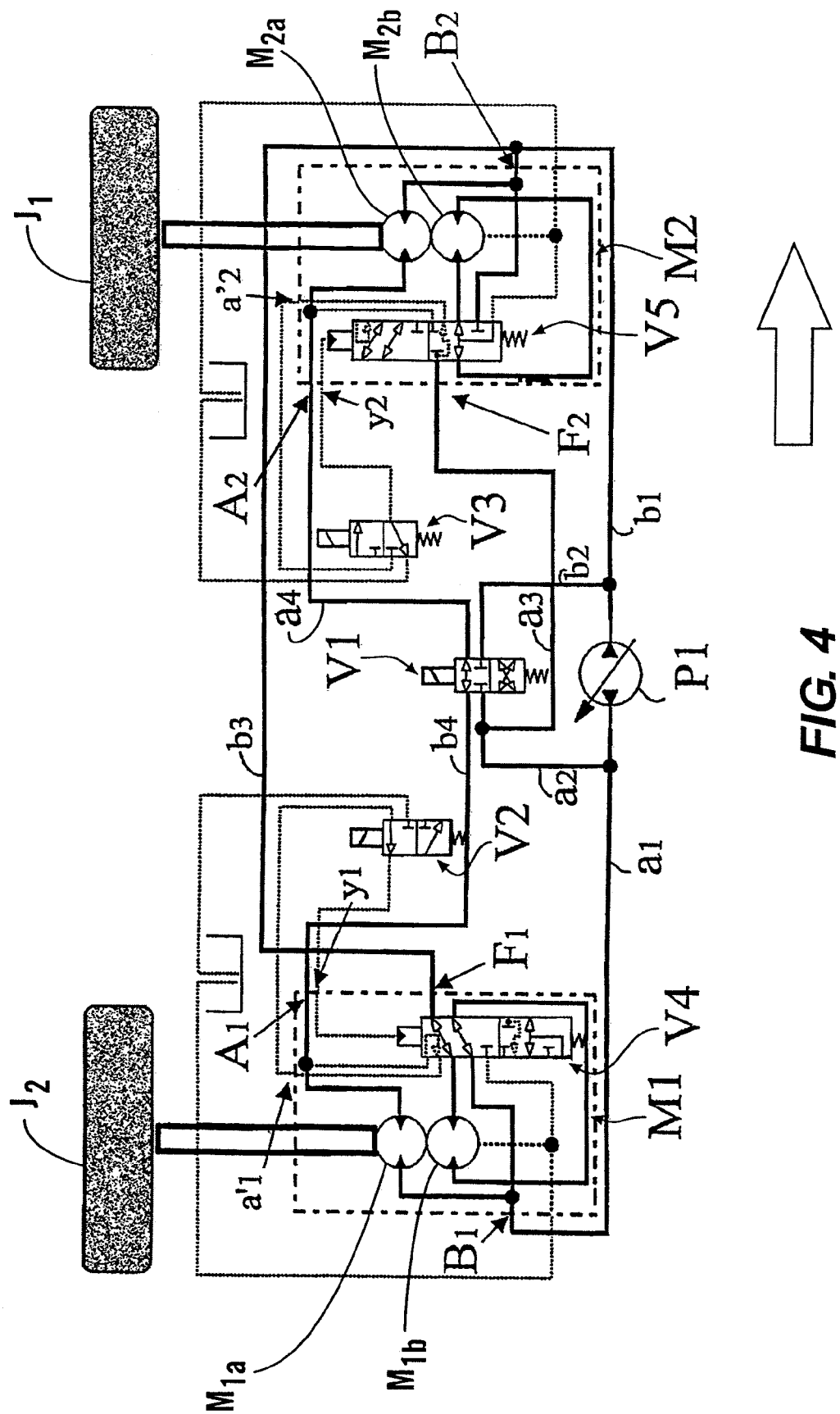
FIG. 4 shows an operating mode, where the motor parts $M_{1a}$ and $M_{2a}$ are in series and the motor part $M_{1b}$ is on while the motor part $M_{2b}$ is off and in a loop R. In the embodiment shown in FIG. 4, the valve $V_3$ is not affected, so the control pressure is not admitted into channel $Y_2$, and the spindle of valve $V_5$ is raised by the effect of the spring force of a spring, so that valve $V_5$ is in the position shown in FIG. 4, in which motor $M_2$ is at partial volume.

FIG. 4 shows a phase in the control, where motors $M_1$ and $M_2$ are connected in parallel and in series. A total working volume of 50% is achieved in the connection. In the embodiment shown in FIG. 4, motor parts $M_{1a}$ and $M_{2a}$ are connected in series and motor part $M_{1b}$ is in operation and motor part $M_{2b}$ is out of operation and in a so-called closed circulation or loop.

Figure 5:
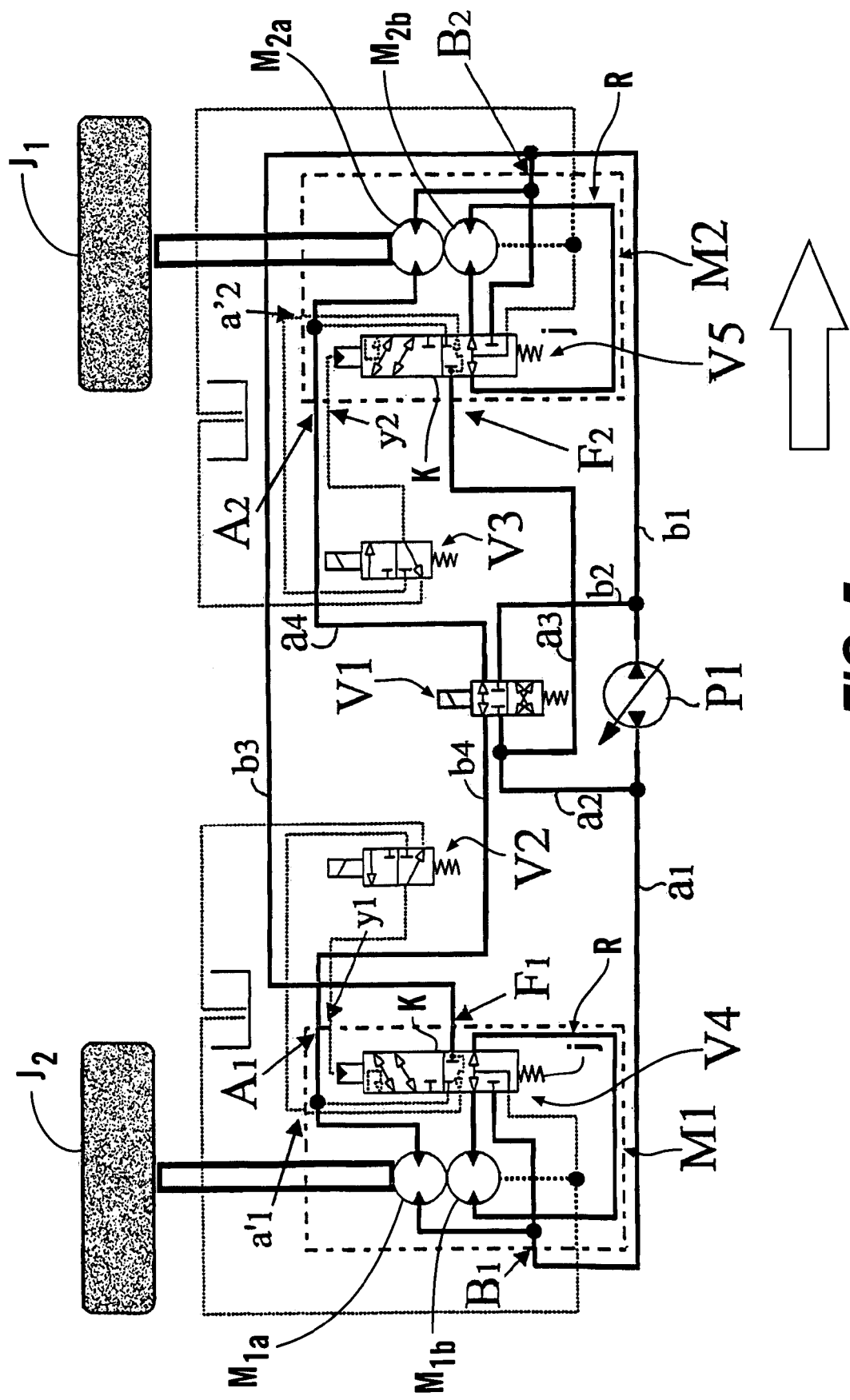
FIG. 5 shows a so-called 25% working volume mode; motor part $M_{1a}$ is in series with motor part $M_{2a}$; motor part $M_{1b}$ is in loop R and in a non-working state and, correspondingly, motor part $M_{2b}$ is in loop R and in the non-working state.

FIG. 5 shows the system in a phase of operation, where motor part $M_{1b}$ is entirely disconnected and it circulates oil in a so-called loop R, whereby the concerned oil is so-called low-pressure oil, and it causes hardly any loss of the coefficient of efficiency. Motor part $M_{1a}$ is on and connected in series through pipe fitting $b_4$ and $a_4$ to motor part $M_{2a}$ of motor $M_2$. Motor part $M_{2b}$ is disconnected and it circulates oil in loop R through the spindle of valve $V_5$ in a manner corresponding with what took place with valve $V_4$. Motor parts $M_{1a}$ and $M_{2a}$ are working and a calculated share of 25% of the volume is in operating use. The connection in question is achieved in such a way that valve $V_2$ is not activated and thus it closes the arrival of control pressure to the end of the spindle of valve $V_4$, whereby spindle $V_4$ is in a position where the motor part $M_{1b}$ of multi capacity motor $M_1$ is in a so-called loop R away from the oil circulation and low-pressure oil circulates through spindle K of valve $V_4$ and through the cylinders of motor part $M_{1b}$. Correspondingly, valve $V_5$ of motor $M_{2b}$ is in a corresponding position and arrival of pressurized oil to motor part $M_2$ as shown in FIG. 5 is prevented. Valve $V_3$ is hereby non-activated, so to speak, and no pressurized medium is allowed to the end of the spindle $V_5$ and the spring J in valve $V_5$ has moved the valve spindle K to the position shown in FIG. 5.

Figure 6:
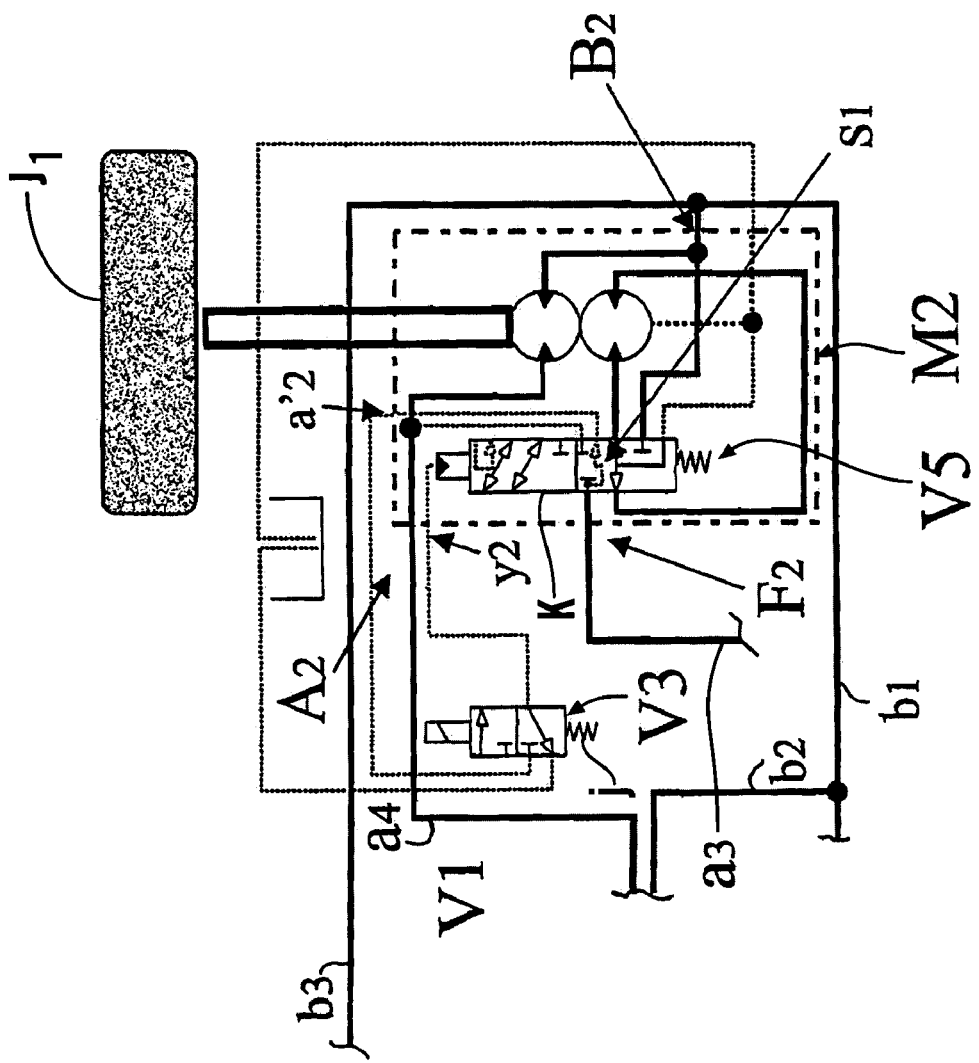
FIG. 6 shows a start-up situation concerning motor $M_2$.

FIG. 6 shows a so-called start-up situation, that is, the initial run situation. Spindle K of valve $V_5$ is in the position shown in FIG. 6, whereby motor $M_2$ is not at full volume as it should be when the vehicle starts moving. However, in the connection $F_2$ to spindle K of valve $V_5$ a sensor line $S_1$ is installed, from which a so-called pressure data identification will reach valve $V_5$ through valve $V_3$ when valve $V_3$ is activated. Hereby, when the pressure increases in inlet line $F_2$ to valve $V_5$, the pressure data is transferred through line $S_1$ and to valve $V_3$ and through this when valve $V_3$ is activated to the end of spindle K of valve $V_5$ through line $Y_2$. Valve $V_5$ will hereby move to a position, where motor $M_2$ is connected to full volume, that is, motor parts $M_{2a}$ and $M_{2b}$ are both in operating use, whereby the maximum moment is also achieved, which is advantageous when starting.

Figure 7A:
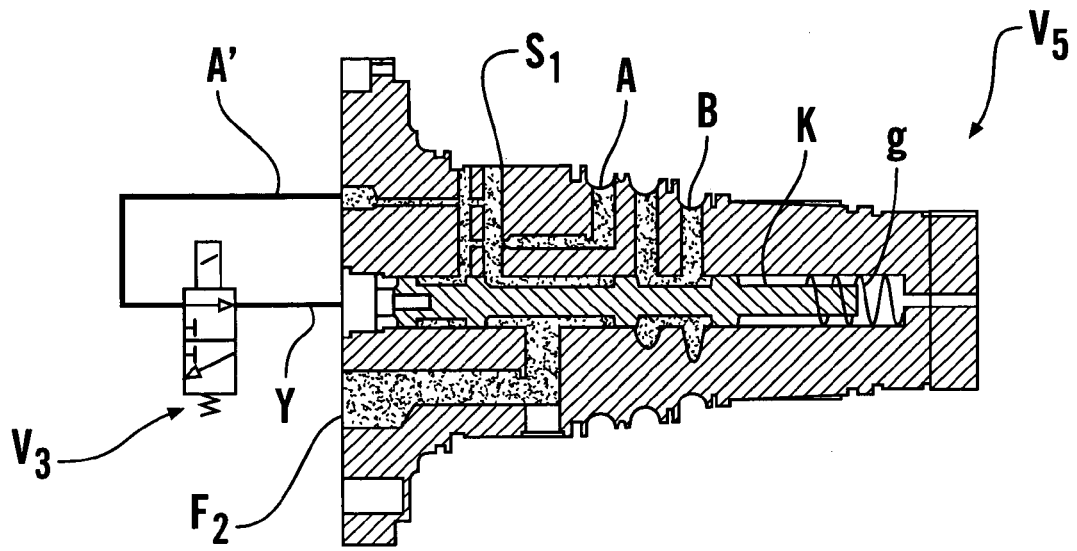
FIG. 7A shows the solution of FIG. 6 as regards a spindle K.
Figure 7B:
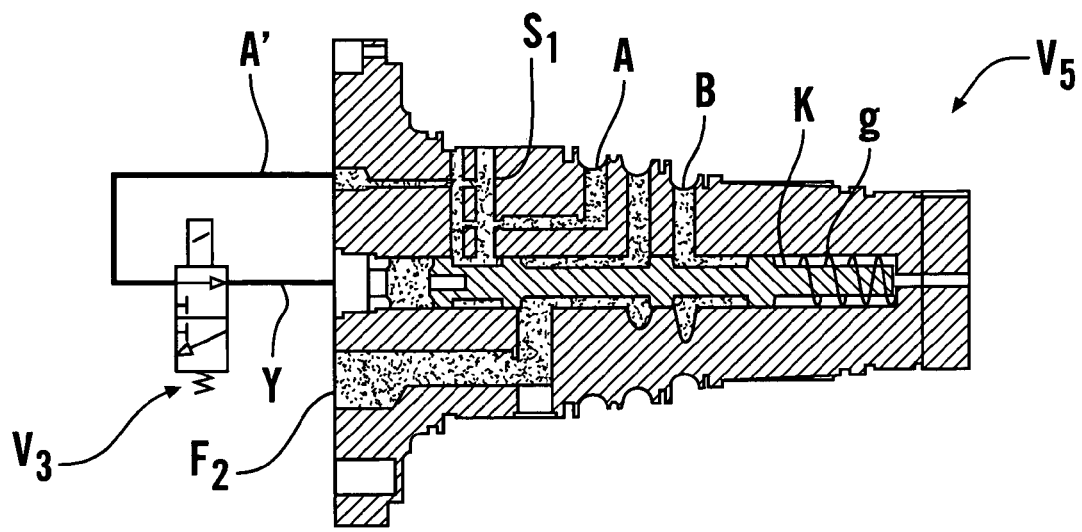

FIG. 7A shows implementation of the above-mentioned start-up situation in the area of spindle structure K of valve $V_5$. Through inlet $F_2$ the control pressure is conducted by way of valve spindle K to valve $V_3$ and further, as valve $V_3$ is activated according to the figure, the pressure is transferred through line Y to the end of spindle K. The spindle K is hereby moved to the position shown in FIG. 7B. As shown in FIG. 7B, the control pressure has moved spindle K to a position where working pressure from line $F_2$ is admitted through spindle K further to the motor part $M_{2b}$ of motor $M_2$. At the end of spindle K there is a spring J. Such an embodiment is also possible, where the spring force of spring J is replaced by the effective force of a pressurized medium, the spring or pressurized medium forming a biasing element.

Figure 8A:
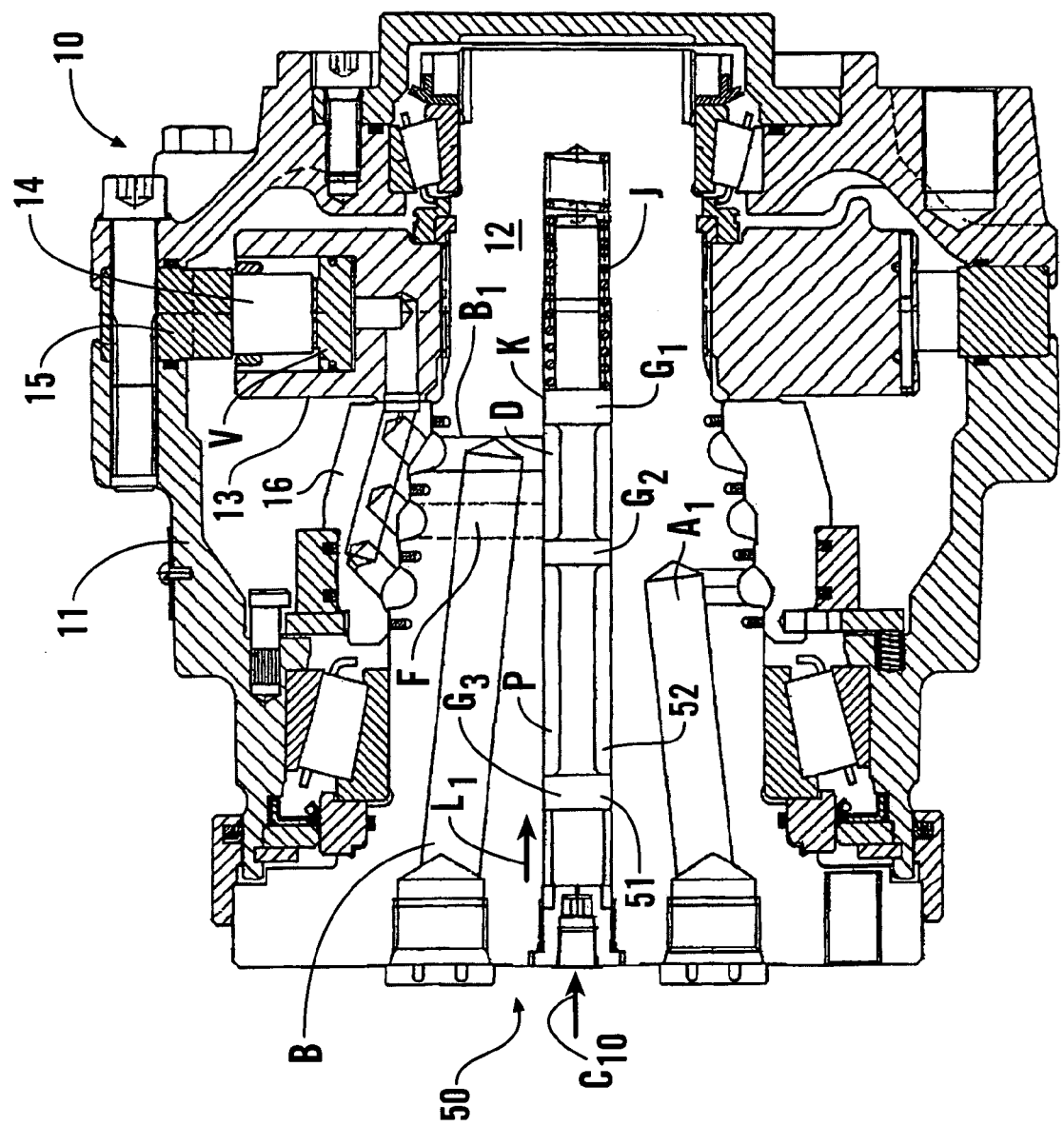
FIGS. 8A and 8B are two different lengthwise cross-sectional views of a multi capacity hydraulic motor according to the invention used in the vehicle and traction transmission system presented above in order to show the channels.
Figure 8B:
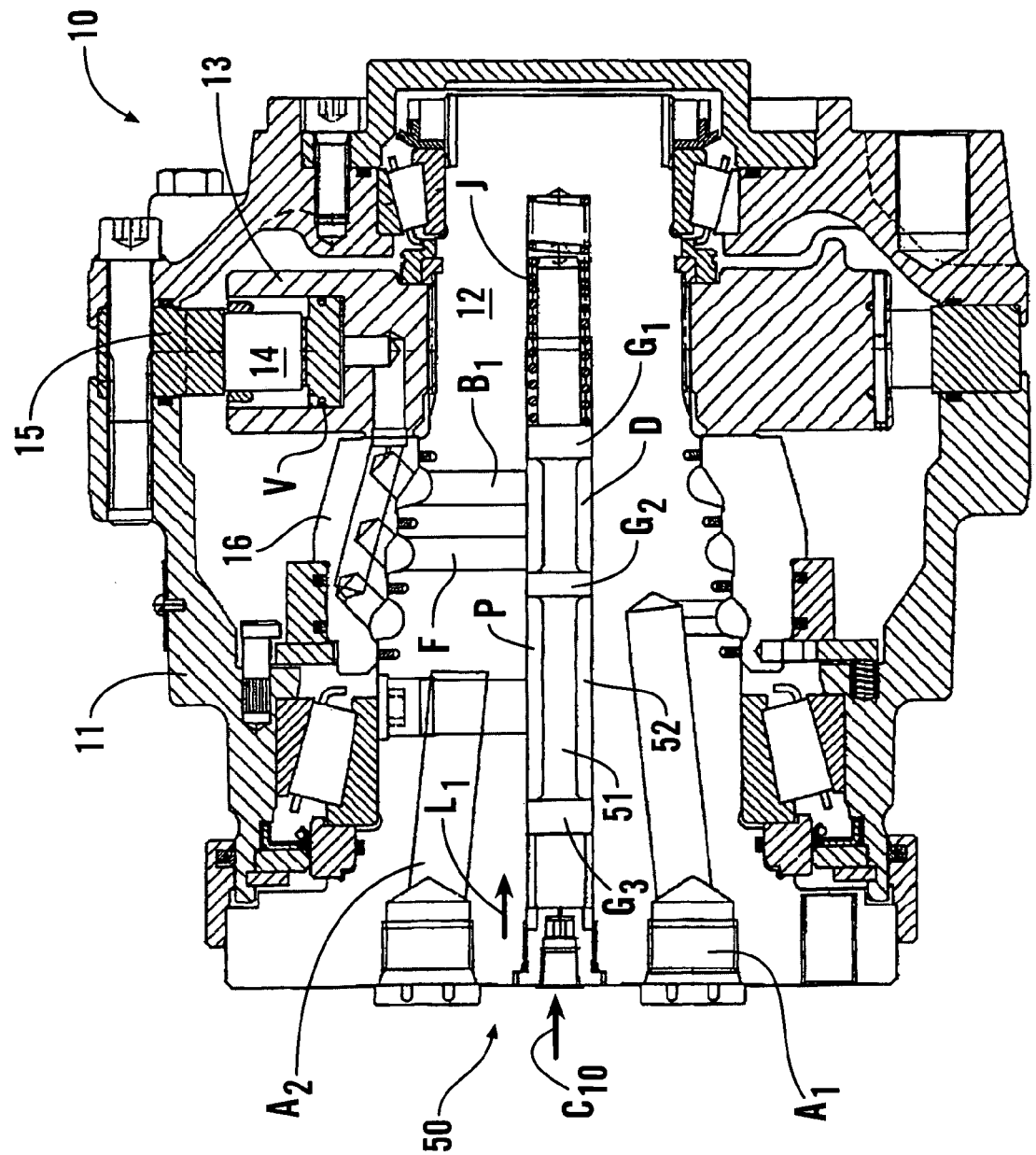

FIGS. 8A and 8B show a piston hydraulic motor 10, which in the embodiment is a radial piston hydraulic motor. The motor 10 shown is suitable for use as a multi capacity motor $M_1$, $M_2$ in the hydraulic system 100 according to the invention for traction transmission. It has a rotating outer periphery 11, that is, a casing and a central shaft 12 in a fixed position. The body 13 surrounding the shaft in a fixed position contains cylinders 11 and pistons, which comprise presser wheels 14, which will rest against a wave-like cam ring 15 rotated by the pistons. A distributing valve 16 rotates with the casing 11 and it comprises peripheral millings and from these bores to the frontal face of the distributing valve, from which channels open to conduct the pressurized medium to a bank of cylinders $Va_1$, $Va_2$ (indicated schematically in FIG. 11) in order to produce a force at the right time through pistons in the working phase to the cam ring 15 in order to rotate this and the connected casing 11. To the pistons V in the working phase a pressurized medium, preferably hydraulic oil, is brought and from the pistons in the non-working phase the almost pressure-free medium, such as oil, is conducted through the distributor's, that is, the distributing valve's 16 frontal face to the distributor's outlet channel and further to the channels of the non-rotated shaft 12, to the outlet connection and further finally out of the hydraulic motor 10. When changing the pressurization with the directional control valve (not shown) between the motor inlet and outlet, the motor's direction of rotation is changed. The spindle is indicated by reference number 51 or K.

The radial piston hydraulic motor 10 comprises a cylinder body 13 and therein radial cylinders and in these pistons V and presser wheels 14. A rotating distributor 16 has a frontal face with bores connected to bores in the piston body 13. A pressurized medium, that is, the working pressure is brought through inlet channels $A_1$ and $A_2$, shown in FIG. 8B. Channel $A_2$ is a pressure channel, which conducts the pressurized medium as shown in the embodiment of FIG. 2 through bores in shaft 12 into a space P in between neck parts $G_2$, $G_3$ in the spindle 51 of control valve 50 and into channel F and further to the outer periphery of shaft 12 and further through grooves and bores in the distributor's side surface into the respective bore in piston body 13 in order to conduct pressurized medium in the right phase to the pistons V in the working phase and to remove the outgoing oil flow taking place from pistons V in the discharging phase from the pistons in the concerned phase. Some pistons are thus in the so-called non-working phase, whereby the pistons remove medium at a lower pressure, such as oil, from the piston space and further through the piston body's channel to the distributing valve 16 and further through its channels to the outlet channel B in shaft 12. Each piston V is in turn in the working phase and in turn in the non-working phase, that is, in the oil-removing phase. The pistons in the working phase press the presser wheels connected to the pistons with force against the wave-like opposite surface, that is, the cam ring 15, whereby the motor's 10 casing connected to the cam ring 15 will be rotated.

When the control valve's 50 central control spindle 51, K with its piston-like necks or broadened parts $G_1$, $G_2$, $G_3$ is in the position shown in FIGS. 8A and 8B, the return channel's oil flow at a lower pressure is conducted from the pistons, that is, the return oil to channel $B_1$ and to the space D in between the spindle's broadened parts $G_1$ and $G_2$ in the spindle cavity 52, such as a bore, from which the oil moves into channel F and further into the channel system of distributing valve 16 and further to the pistons V and cylinders $V_{a2}$, which are at a lower pressure, which is non-working pressure. This is a so-called partial volume mode, for example, a ½ volume mode, whereby the motor has a higher speed of rotation and a lower moment than in the so-called full volume mode. Hereby the bank of cylinders/pistons $V_{a2}$ is in a sense disconnected from operation and it circulates oil at an idle pressure in a loop formed by the closed circuit $B_1$, F.

Figure 9:
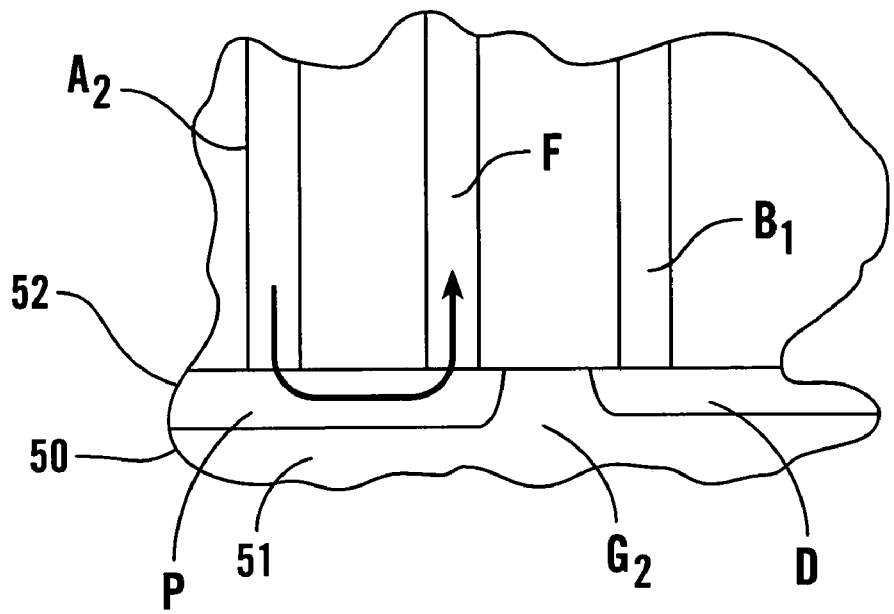
FIG. 9 shows how the control spindle K is moved to a position, where another rotational volume is implemented for the piston hydraulic motor.

FIG. 9 shows the control spindle moved to a position, where piston $G_2$ or the so-called neck is placed in between the channels F and $B_1$ and it closes the connection from channel $B_1$ to channel F, to which a connection is opened $A_2$ for the channel's pressurized oil flow. In the position of the control spindle shown in the figure, pressurized oil is conducted from channel $A_2$ to the left side of the piston $G_2$ or neck in the figure and further into channel F and further to the distributing valve and through this at full pressure to the pistons $V_{a2}$ which are at a certain working pressure. The banks of piston-type cylinders $V_{a1}+V_{a2}$ are hereby in operation for the oil brought at full pressure from pump $P_1$. The bank of piston-type cylinders $V_{a1}$ for the pressurized oil brought through channel $A_1$ is always in operation.

The control spindle 51 or K of the actuator, that is, control valve 50 is controlled according to the pressure existing in channel $A_1$. If the pressure in channel $A_1$ falls below a certain critical value, the control valve will move under the influence of spring J to the position shown in FIG. 1 and the mode 1 is achieved according to FIG. 1, whereby only some pistons in bank $V_{a1}$, for example, a half, will have working pressure, whereas the rest; bank $V_{a2}$ will have a low pressure, the so-called idle pressure of the feedback of return circulation, whereby bank $V_{a2}$ is not in operation in the actual sense.

If the pressure in channel $A_1$ increases, control spindle 51 is moved into the position shown in FIG. 2 by a pressure produced at the left-hand end of spindle 51. The function of the spring J located in between the right-hand end of the control spindle's 51 spindle cavity 52 and the spindle's neck $G_1$ is to act as a counter-force to the force generated by the control pressure. When choosing an operating mode for the multi capacity motor 10, the spindle 51 is thus moved with the aid of control pressure brought to the left-hand end (in the figure) of the spindle cavity 52 as shown in FIGS. 8A and 8B by arrows $L_1$ against the spring force of spring J.

In all operating modes, both at full rotational volume and at partial rotational volume, the bank of cylinders/pistons $Va_1$ in connection with working pressure channel $A_1$ is in operation at all times.

Figure 11:
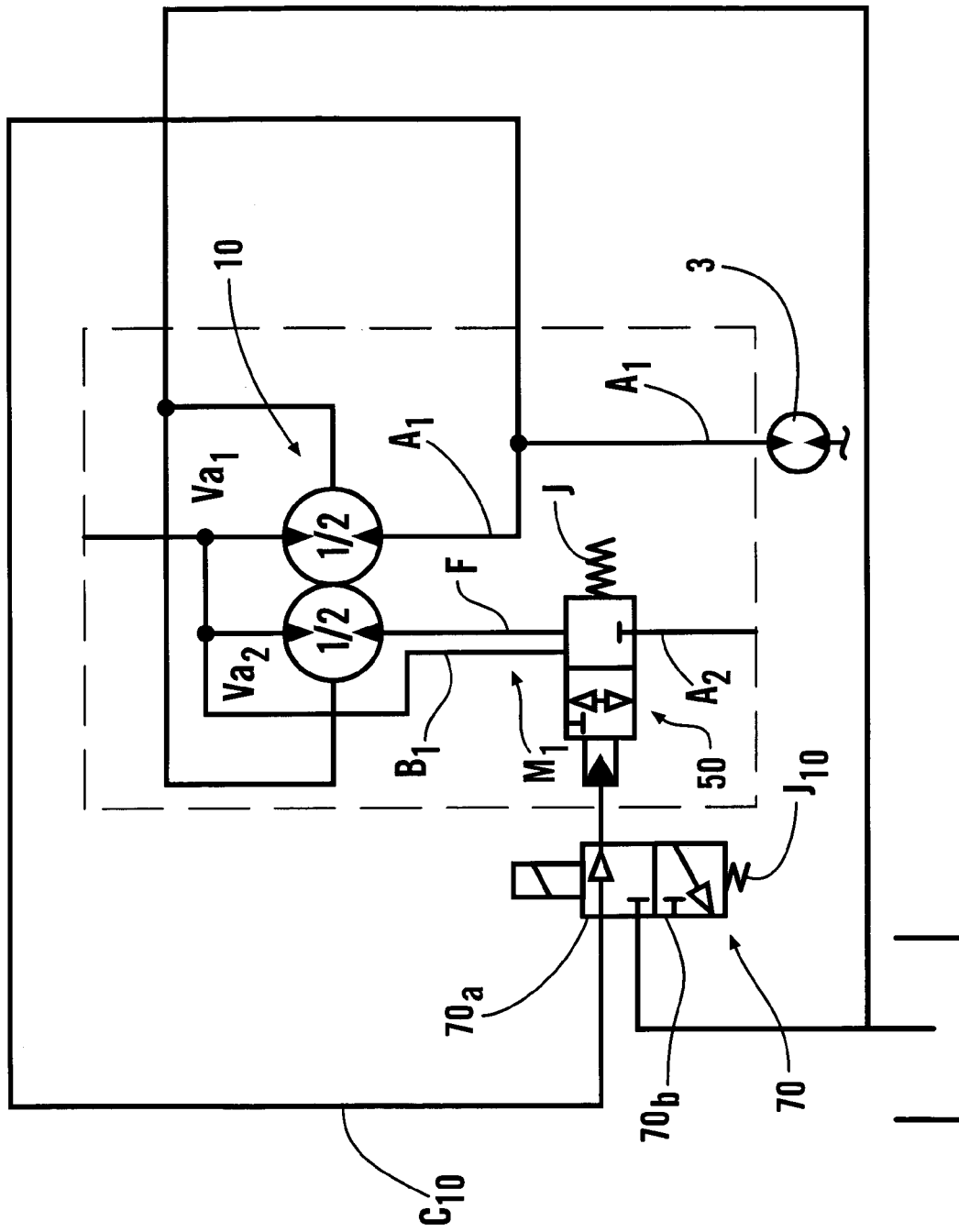
FIG. 11 is a schematic view of the hydraulic system of the motor according to FIGS. 8A and 8B.

FIG. 11 shows a schematic view of the hydraulic system of the motor 10 shown in FIGS. 8A and 8B. Hydraulic oil is brought under a pressure along two channels $A_1$ and $A_2$ to the multi capacity motor 10. From the multi capacity motor 10 there is a loop or set of channels $M_1$, by which oil is circulated through the pistons at non-working pressure inside the motor. As shown in the figure, the system further comprises a pipe fitting $C_{10}$ or channel or other such to conduct control pressure to valve 50 from channel $A_1$, by which the operating mode of the multi capacity motor 10 can be controlled, in which partial rotational volume is carried out along with a pure connection in series of successive hydraulic motors when the concerned multi capacity motor tends to slip.

FIG. 11 also shows a directional control valve 70, which is controlled by a solenoid against the spring force of spring $J_{10}$. When the directional control valve section 70a is on as shown in the figure, the pressure existing in line $C_{10}$ is detected and it is moved to actuator 50, preferably to the end of spindle 51 of the valve equipment, to affect the valve spindle against the spring force of spring J. When section 70b of the directional control valve 70 is turned on when no control voltage is supplied to the solenoid, the connection of pressure line $C_{10}$ to the spindle 51 is closed, whereby the spring J of actuator 50 will move the spindle to a position, where section $V_{a2}$ is closed and the motor is operated at a higher speed.

Figure 3:
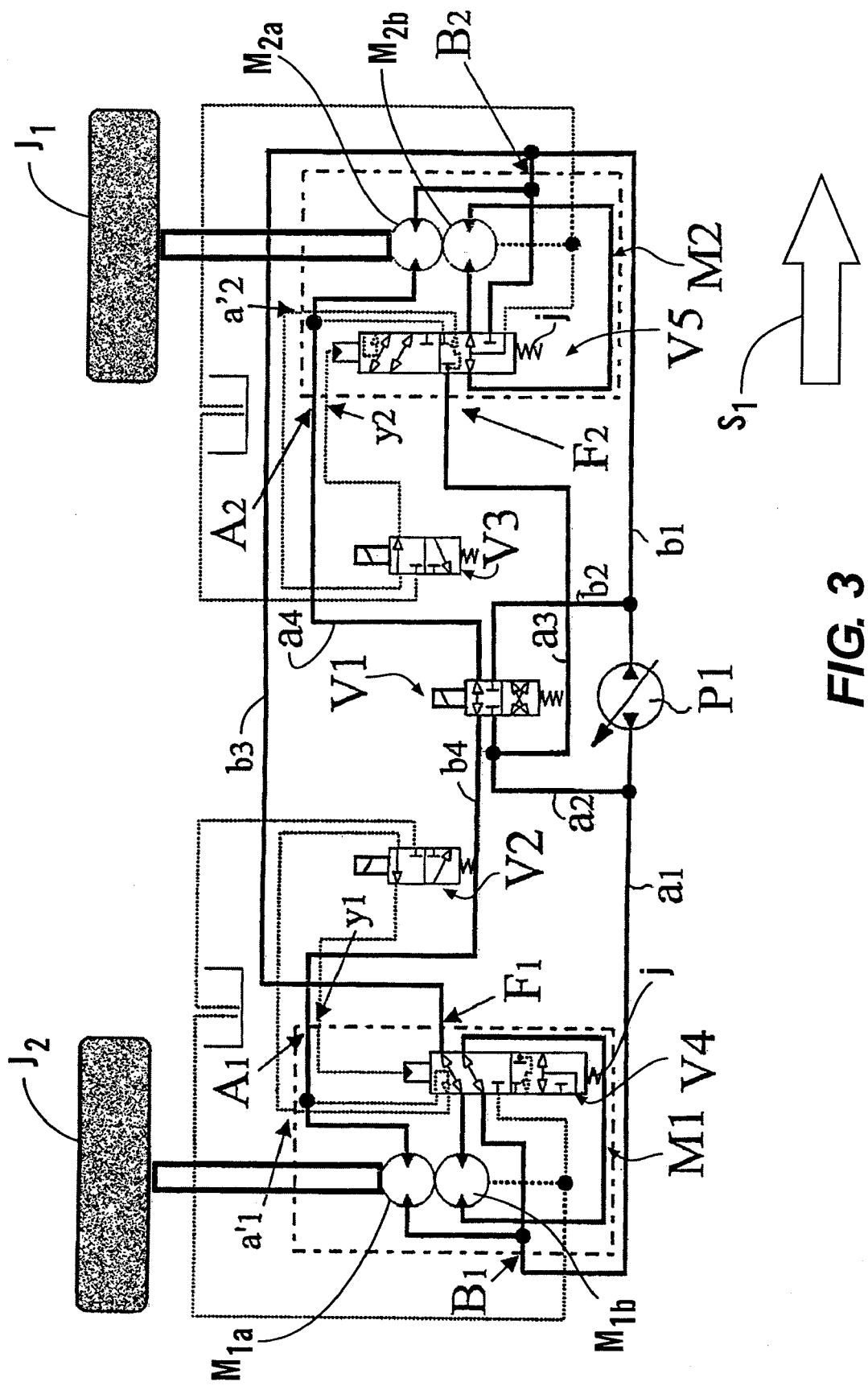
FIG. 3 shows an anti-slip situation, where motor $M_2$ has moved over to partial volume, where the motor parts $M_{1a}$ and $M_{2a}$ are in series. Motor part $M_{1b}$ is in working operation and motor part $M_{2b}$ is plugged and thus disconnected.
Figure 10:
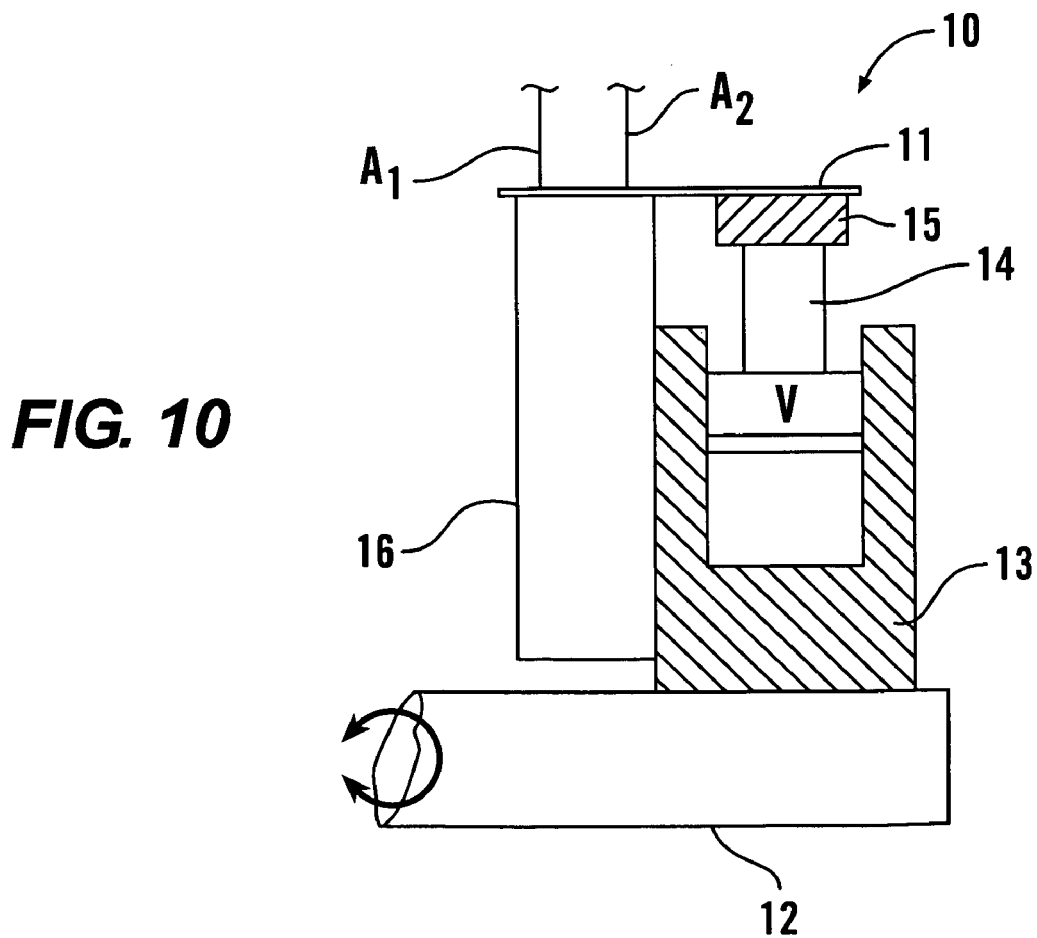
FIG. 10 is a view in principle of an embodiment of a piston hydraulic motor, where the shaft rotates, but the motor casing is non-rotating and the shaft is rotated. The solution for forming a multi capacity motor is the same, that is, as has been described in connection with the earlier figures.

FIG. 10 is a schematic view of another type of hydraulic motor 10, which operates in the same manner as the presented multi capacity motor and in this embodiment comprises similar structural parts as in the earlier figures. An essential difference in this embodiment is that shaft 12 with its piston body 13 is rotating. The motor's 10 actual casing 11 and the connected distributor 16 or distributing valve and cam ring 15 are non-rotating. In the full volume solution $Va_1+Va_2$ oil at working pressure is conducted to the piston body's all pistons/cylinders $Va_1$, $Va_2$ through channels $A_1$ and $A_2$, by way of the distributor 16 and the motor's 10 non-rotating casing 11. The equipment arrangement and the operation are the same as in the embodiment in the FIGS. 1, 2 and 3 shown above, where the radial piston hydraulic motor's casing 11 and the distributor 16 are rotated and in which embodiment the shaft 12 and piston body 13 are in a fixed position. In the embodiment shown in FIG. 4, the hydraulic motor's 10 casing 11 and the connected distributing valve 16 are non-rotating. Shaft 12 of motor 10 and the connected piston body 13 are rotating. The operation of the embodiment is the same as the operation of the embodiment of the hydraulic motor presented by the earlier FIGS. 1, 2 and 3.

Figure 12:
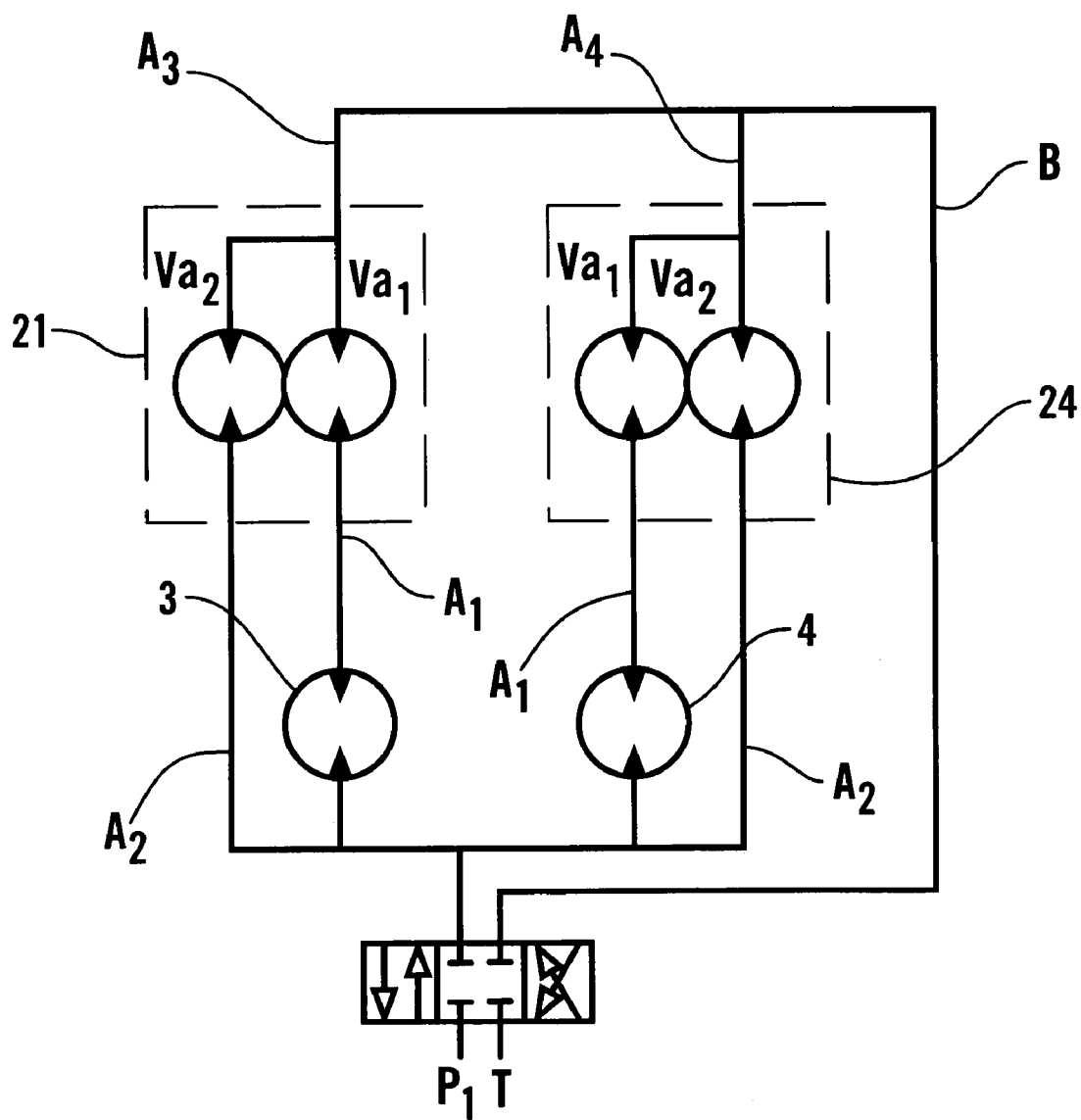
FIG. 12 shows a piston hydraulic motor in the anti-slip regulation of a harvester.

FIG. 12 shows a multi capacity motor 21 adapted to the anti-slip regulation of timber feeding. The multi capacity motor 21 is located to supply timber together with another multi capacity motor structure 24, which is placed in parallel with said first motor 21. The motor's 21 bank of cylinders/pistons $Va_1$ is connected in series with a conventional hydraulic motor 3 and the other multi capacity motor's 24 bank of cylinders/pistons $Va_1$ is in series with another conventional hydraulic motor 4. In both motors, the multi capacity motor's 21, 24 bank of cylinders/pistons $Va_2$ is connected directly to a pump channel $A_2$ and to a pump $P_1$, whereby as regards bank $Va_2$ the connection is a connection in parallel with motors 21, 24. When in timber-feeding the motor tends to slip at full rotational volume $Va_1+Va_2$, bank $Va_2$ is disconnected with the aid of the arrangement shown in FIG. 3.

Figure 13:
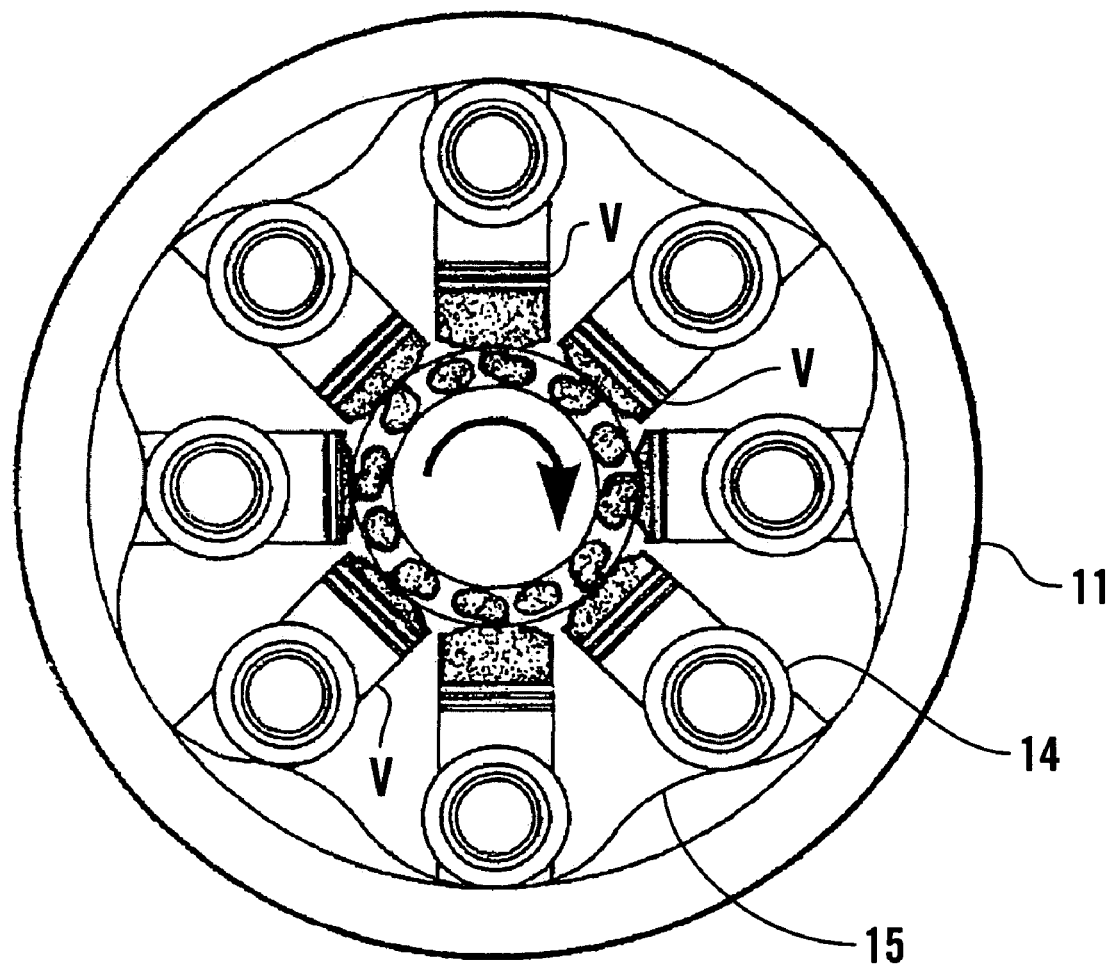
FIG. 13 is a cross-sectional view of a radial piston hydraulic motor.

FIG. 13 is an illustrating presentation of radial cylinders and pistons relating to the state of the art. In the embodiment shown in the figure, there are eight pistons and thus eight cylinders, and thus the bank of pistons/cylinders $Va_1$ may comprise, for example, four pistons and the connected cylinders and, correspondingly, bank $Va_2$ may comprise four pistons and cylinders. FIG. 13 is a cross-sectional view of a radial piston hydraulic motor, which comprises eight hydraulic cylinders and the connected pistons.

In the $Va_1+Va_2$ mode, hydraulic oil under working pressure is conducted to all pistons, which are in the working phase. In the $Va_1$ mode, hydraulic oil at working pressure is only conducted to bank $Va_1$, whereas to bank $Va_2$ in said mode only hydraulic oil at a low pressure, not oil at working pressure is conducted to its pistons, even to those in the working phase. However, those pistons, which are in the working phase at each time under the working pressure of pump $P_1$, may vary in one and the same hydraulic motor.

In this application, the word channel is understood as meaning pipes, hoses, bores and other such connections. In this application, the word mode or operating mode or partial or full rotational volume is used for the multi capacity motor's certain banks of cylinders and their connected pistons. The rotational volume can be full rotational volume $Va_1+Va_2$ or partial rotational volume $Va_1$.

I claim:

1. A traction transmission and control system comprising:
    a first radial-piston motor operatively connected to drive a first vehicle wheel, the first radial-piston motor comprising:
    a central shaft with a plurality of piston bodies with a plurality of pistons, one of said plurality of pistons mounted in each piston body for radial motion,
    a plurality of presser wheels, one of said plurality of presser wheels mounted on each piston,
    a casing surrounding the central shaft, the central shaft and the casing mounted for relative rotation,
    a cam ring having a wave-shaped surface mounted to the casing so that the presser wheels mounted to the pistons bear on the cam ring wave-shaped surface,
    wherein the plurality of piston bodies are divided into a first group of piston bodies and a second group of pistons bodies,
    portions of the central shaft forming a first supply channel which is connected to the first group of piston bodies by a distributer mounted to rotate,
    portions of the central shaft forming a second supply channel which is connected to the second group of piston bodies by the distributer,
    a first actuator arranged to open and close the second supply channel with respect to the second set of piston bodies;
    a second radial-piston motor operatively connected to drive a second vehicle wheel, the second radial-piston motor comprising:
    a central shaft with a plurality of piston bodies with a plurality of pistons, one of said plurality of pistons mounted in each piston body for radial motion,
    a plurality of presser wheels, one of said plurality of presser wheels mounted on each second motor piston,
    a casing surrounding the second motor central shaft, the second motor central shaft and the casing mounted for relative rotation,
    a cam ring having a wave-shaped surface mounted to the second motor casing so that the second motor presser wheels mounted to the second motor pistons bear on the cam ring wave-shaped face,
    wherein the plurality of second motor piston bodies are divided into a third group of pistons bodies and a fourth group of piston bodies,
    portions of the second motor central shaft forming a third supply channel which is connected to the third group of piston bodies by a distributer mounted to rotate,
    portions of the second motor central shaft forming a fourth supply channel which is connected to the fourth group of piston bodies by the second motor distributer,
    a second actuator arranged to open and close the fourth supply channel with respect to the fourth set of piston bodies;
    a series connection between the first group of piston bodies and the third group of piston bodies, the series connection placing the first group of piston bodies in series with the third group of piston bodies, so that the third supply channel is connected to receive hydraulic fluid which has passed through the first supply channel and the first group of piston bodies, so forming an anti-slip connection between the first vehicle wheel and the second vehicle wheel;
    wherein the first actuator and the second actuator are connected to be controlled according to a pressure existing in the series connection, so that below a selected pressure in the series connection the second group of piston bodies is closed off from the second supply channel and the fourth group of piston bodies is closed off from the fourth supply channel.

2. The traction transmission and control system of claim 1 wherein the first motor central shaft is connected to the first vehicle wheel and the first actuator is mounted in said central shaft, with portions of the central shaft forming a bore having a first end at which is mounted a spring and a second end in actuation pressure receiving relation to the series connection and the first actuator further comprises a spindle mounted for movement in the bore; and wherein the second motor central shaft is connected to the second vehicle wheel and the second actuator is mounted in said second motor central shaft, with portions of the second motor central shaft forming a bore having a first end at which is mounted a spring and a second end in actuation pressure receiving relation to the series connection, and the second actuator further comprises a second spindle mounted for movement in the second motor bore.

3. The traction transmission and control system of claim 1 further comprising a valve positioned in the series connection and arranged to break the series connection between the first group of piston bodies and the third group of piston bodies by connecting the first group of piston bodies to a return line of a pump, and by connecting the third group of piston bodies to a supply line from the pump.

4. The traction transmission and control system of claim 2 further comprising a first shut-off valve arranged to shut off arrival of control pressure to the first actuator so the spring will move the spindle to thus close the first actuator, and a second shut-off valve arranged to shut off arrival of control pressure to the second actuator so the spring will move the spindle to thus close the second actuator.

5. The traction transmission and control system of claim 4, wherein the fourth supply channel for supplying pressurized oil to the fourth group of piston bodies can be closed automatically, and the second actuator comprises a pressure connection to conduct control pressure to the second end of the spindle of the second motor through the second shut-off valve, whereby when the pressure in connection to the fourth supply channel increases in the second end of the spindle to exceed a spring force of the spring the second actuator is opened wherein the second motor is connected for a full volume of pressurized medium to enter the fourth group of piston bodies.

6. A traction transmission and control system comprising:
a vehicle having a plurality of wheels;
a hydraulic pump;
a first multi capacity hydraulic motor having a first rotation volume connected to the pump, and a second rotation volume arranged to be connected to the pump through a first valve which is biased by a biasing element in a closed position, the first motor arranged to drive a first wheel of said plurality of wheels;
a second multi capacity hydraulic motor having a third rotation volume connected in series with the first rotation volume so that oil from the pump passes through the first rotation volume and by way of a return line passes through the third rotation volume of the second motor, and the second multi capacity hydraulic motor having a fourth rotation volume arranged to be connected to the pump through a second valve which is biased by a biasing element in a closed position, the second motor arranged to drive a second wheel of said plurality of wheels; and
wherein the first valve and the second valve are connected to be held opened by oil pressure in the return line between the first rotation volume and the third rotation volume, and to close when pressure in the return line falls below a selected value.

7. The traction transmission and control system of claim 6 wherein the first multi capacity hydraulic motor and the second multi capacity hydraulic motor are radial piston hydraulic motors, and each of the first rotation volume, the second rotation volume, the third rotation volume, and the fourth rotation volume are formed by a plurality of piston bodies with a plurality of pistons, one of said plurality of pistons mounted in each piston body for radial motion.

8. The traction transmission and control system of claim 7 wherein the first motor has a central shaft which is connected to the first wheel and the first valve is mounted in said central shaft with portions of the central shaft forming a bore having a first end at which is mounted a spring forming the biasing means and the bore having a second end in actuation pressure receiving relation to the return line, and wherein a spindle is mounted for movement in the bore as part of the first valve, and
wherein the second motor has a central shaft which is connected to the second wheel and the second valve is mounted in said second motor central shaft, with portions of the second motor central shaft forming a bore having a first end at which is mounted a spring forming the biasing means and having a second end in actuation pressure receiving relation to the return line, and wherein a spindle is mounted for movement in the bore as part of the second valve.

* * * * *